(12) United States Patent
Bolle

(10) Patent No.: US 9,753,233 B2
(45) Date of Patent: Sep. 5, 2017

(54) METHOD AND APPARATUS FOR MAKING AN OPTICAL FIBER ARRAY

(71) Applicant: Alcatel-Lucent USA Inc., Murray Hill, NJ (US)

(72) Inventor: Cristian A Bolle, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/670,816

(22) Filed: Mar. 27, 2015

(65) Prior Publication Data

US 2016/0282569 A1  Sep. 29, 2016

(51) Int. Cl.
*G02B 6/38* (2006.01)
*G02B 6/25* (2006.01)
*G02B 6/40* (2006.01)

(52) U.S. Cl.
CPC ............. *G02B 6/3898* (2013.01); *G02B 6/25* (2013.01); *G02B 6/3861* (2013.01); *G02B 6/406* (2013.01)

(58) Field of Classification Search
CPC ...... G02B 6/3898; G02B 6/25; G02B 6/3861; G02B 6/05; G02B 6/406
See application file for complete search history.

(56) References Cited

U.S. PATENT DOCUMENTS

| | | | | |
|---|---|---|---|---|
| 4,406,515 A | * | 9/1983 | Roberts ................ | G02B 6/3835 385/62 |
| 4,594,121 A | * | 6/1986 | Mitch ..................... | B65H 69/00 156/158 |
| 5,136,672 A | * | 8/1992 | Mulholland ......... | G02B 6/3849 385/53 |
| 5,436,994 A | * | 7/1995 | Ott ........................ | G02B 6/3821 385/86 |
| 5,469,521 A | * | 11/1995 | Coutts .................. | G02B 6/3861 385/77 |
| 5,521,996 A | * | 5/1996 | Ames .................... | G02B 6/3817 385/53 |
| 5,559,917 A | * | 9/1996 | Ott ........................ | G02B 6/3821 385/86 |
| 5,737,463 A | * | 4/1998 | Weiss ................... | G02B 6/3831 385/59 |
| 5,863,242 A | * | 1/1999 | Waldron ............... | B24B 19/226 451/364 |
| 5,896,479 A | * | 4/1999 | Vladic ................. | G02B 6/3831 385/59 |
| 6,007,258 A | * | 12/1999 | Marchitto ................ | G02B 6/25 385/60 |
| 6,074,100 A | * | 6/2000 | Rowland ................. | G02B 6/25 385/60 |

(Continued)

*Primary Examiner* — Peter Radkowski
(74) *Attorney, Agent, or Firm* — H. Shamsaei Far

(57) ABSTRACT

An apparatus for manufacturing an array of optical fiber using a handling tool, a clamp element, a cutter and an adhesive reservoir. The handling tool is capable of moving a portion of an optical fiber in a three-dimensional space and hold the portion of the optical fiber together with the clamp element to allow the cutter to produce a cleaved end in the optical fiber. The handling tool is further configured for immersing the cleaved end of the optical fiber in the adhesive reservoir and inserting the cleaved end of the optical fiber with adhesive adhered thereto inside a ferrule of an array of ferrules. A structure comprising the array of ferrules and a method of manufacturing an array of optical fibers are also disclosed.

20 Claims, 5 Drawing Sheets

(56) References Cited

U.S. PATENT DOCUMENTS

| | | | | |
|---|---|---|---|---|
| 6,168,319 B1 * | 1/2001 | Francis | ................. | G02B 6/2937 385/55 |
| 6,565,265 B2 * | 5/2003 | Ohtsuka | .................... | G02B 6/25 385/60 |
| 6,625,351 B2 * | 9/2003 | Cox | ......................... | B29C 41/20 385/31 |
| 6,655,852 B2 | 12/2003 | Bolle | | |
| 6,760,516 B2 * | 7/2004 | Brun | .................. | G02B 6/29364 385/31 |
| 6,827,500 B2 * | 12/2004 | Basavanhally | ...... | G02B 6/3863 385/62 |
| 7,076,131 B2 | 7/2006 | Bolle | | |
| 7,187,826 B2 * | 3/2007 | Brun | .................. | G02B 6/29364 385/140 |
| 7,377,703 B2 * | 5/2008 | Weynant | ............... | G02B 6/3807 385/95 |
| 8,132,971 B2 * | 3/2012 | Luther | .................. | G02B 6/3834 385/52 |
| 9,016,953 B2 * | 4/2015 | Ott | ........................ | G02B 6/3821 264/1.25 |
| 2001/0033712 A1 * | 10/2001 | Cox | ........................ | B29C 41/20 385/33 |
| 2001/0036341 A1 * | 11/2001 | Ohtsuka | .................... | G02B 6/25 385/78 |
| 2002/0081067 A1 * | 6/2002 | Brun | .................. | G02B 6/29364 385/34 |
| 2003/0002818 A1 * | 1/2003 | Basavanhally | ...... | G02B 6/3863 385/80 |
| 2004/0234204 A1 * | 11/2004 | Brun | .................. | G02B 6/29364 385/39 |
| 2007/0031090 A1 * | 2/2007 | Weynant | ............... | G02B 6/3807 385/60 |
| 2010/0215319 A1 * | 8/2010 | Childers | ............... | G02B 6/3885 385/60 |
| 2012/0093462 A1 * | 4/2012 | Childers | ............... | G02B 6/3831 385/33 |
| 2012/0145307 A1 * | 6/2012 | Margolin | ............. | G02B 6/3885 156/72 |
| 2014/0064665 A1 * | 3/2014 | Ott | ........................ | G02B 6/3821 385/60 |
| 2015/0293313 A1 * | 10/2015 | Ott | ........................ | G02B 6/3821 385/59 |

* cited by examiner

METHOD AND APPARATUS FOR MAKING AN OPTICAL FIBER ARRAY

TECHNICAL FIELD

The present disclosure is directed, in general, to techniques for manufacturing an array of optical fibers.

BACKGROUND

It is often desirable to have very precise two-dimensional arrays of optical fibers with terminating ends located on a common surface or plane e.g., for use with an all optical switch. Such array of optical fibers may comprise a considerable number of fibers, e.g. about 500 or more, located at their respective end adjacent (at a well defined distance) to each other so as to allow the transmission of a corresponding array of light beams such that each individual optical fiber can transmit a corresponding light beam, typically one beam per fiber for single core fibers and more than one for multi-core fibers.

In this regard, manufacturing such an array of optical fibers would require great precision in the various stages thereof. Some of these stages may typically include cleaving the optical fibers, installing them within the array and bonding them such that the respective terminating ends of the optical fibers within the array are substantially coplanar to collectively form a flat face. These operations require a high level of precision and are often costly and time consuming.

SUMMARY

Some embodiments of the disclosure feature an apparatus comprising:
a handling tool configured to hold and move a portion of an optical fiber in a three-dimensional space, said portion having a free end;
a clamp element configured to clamp the free end of the optical fiber;
a cutter configured to cleave the portion of the optical fiber to produce a cleaved portion of the optical fiber having a cleaved end;
an adhesive reservoir;
wherein the handling tool is configured to:
move the portion of the optical fiber toward the clamp element;
hold the portion of the optical fiber, with the free end of the optical fiber clamped by the clamp element, to allow the cutter to produce the cleaved portion of the optical fiber having a cleaved end;
immerse the cleaved portion of the optical fiber in the adhesive reservoir; and
insert the cleaved portion of the optical fiber with adhesive adhered thereto inside a ferrule of an array of ferrules.

Some embodiments of the disclosure feature a structure comprising:
a plurality of ferrules at least some of the plurality of ferrule each being configured to receive a respective cleaved end of an optical fiber at an entrance end and allow the passage of the optical fiber at an exit end;
a chuck configured to hold the plurality of ferrules in an array; and
a transparent plate provided at a side of the chuck proximate to the exit ends of the plurality of ferrules; the plate being configured to receive the respective cleaved end of the optical fiber bonded on a surface thereof.

Some embodiments of the disclosure feature a method comprising:
holding, by a handling tool, a portion of an optical fiber in a three-dimensional space, said portion having a free end;
moving, by the handling tool, the portion of the optical fiber toward a clamp element;
clamping, by the clamp element, the free end of the optical fiber held by the handling tool;
cleaving, by a cutter, the portion of the optical fiber to provide a cleaved portion of the optical fiber having a cleaved end;
immersing, by the handling tool, the cleaved portion of the optical fiber in the adhesive reservoir; and
inserting, by the handling tool, the cleaved end of the optical fiber with adhesive adhered thereto inside a ferrule of an array of ferrules.

DETAILED DESCRIPTION OF ILLUSTRATIVE EMBODIMENTS

Figure 1A:
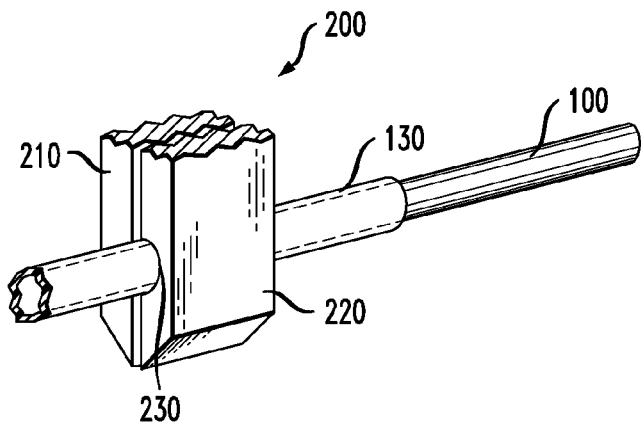
FIGS. 1A and 1B are exemplary schematic representations of a perspective view and a side view, respectively, of a part of a handling tool holding a portion of an optical fiber according to some embodiments.

Arrays of optical fibers, as the ones typically used in optical communications networks, are typically made by a number of single-mode optical fibers. Such single-mode optical fiber, may typically have a core with a diameter of 6-9 microns and a cladding with a diameter of 125 microns. When installed in the array, positional tolerances of less than 2-3 microns from true position and angular tolerances of less than 0.5 degrees are typically required for each fiber in the fiber array.

According to a typical known technique, fiber arrays are made by fabricating a support plate into which holes are made, and an individual fiber end is inserted into each hole. The support plates may be made from a variety of materials, with silicon or a ceramic being preferred when a very precise array is required. The holes may be made by etching or drilling into the support plate, using either mechanical techniques or through the use of a laser. The individual fiber ends are locked into place, e.g., with a small amount of glue. After that, the remaining fiber stubs coming out of the front of the support plate are cut off, and the resulting ends are polished flat. Then a special optical antireflection coating may be applied to the polished fiber ends. Finally an array of lenses is aligned and attached to the fiber array to obtain an array of collimated light beams, each coming from an individual fiber.

The prior art technique suffers from certain drawbacks. In the first place, a major drawback of the known technique is that the various steps during the process of manufacturing an array of optical fibers are performed manually (although using certain fixtures). This can increase the costs of manufacturing as well as the risk of human errors in the operations.

Other drawbacks may be the following. For example, the perforated support plates that can be made are usually rather thin, due to limitations in the technology for the support plates and their holes. Such a thin support plate is able to provide only a rather short guide and hold for each fiber so that, disadvantageously, the mechanical structure of the resulting fiber array is less than desirable. Further disadvantageously, the support plates have to be custom-made, which usually requires special tools and expertise. Assembly of the array also requires special skills and precise fixtures. The polishing step at the end of the assembly is not trivial, and it is very time-consuming. A custom coating chamber typically has to be used to apply an optical coating to the fiber ends.

Solutions aiming at overcoming at least some of the drawbacks of the prior art technique have been proposed such as the ones described in U.S. Pat. Nos. 6,655,852, 6,827,500 and 7,076,131 the content of each of which is incorporated herein by reference in their entirety. From these documents, the former two further disclose the use of ferrules through which individual optical fibers are inserted so as to form the array.

The present disclosure relates to a new mechanized technique for inserting such individual optical fibers in the respective ferrules.

It is to be noted that the drawings accompanying the present specification are not to scale.

According to some embodiments, an apparatus is disclosed which is configured for assembling optical fibers in an array.

Figure 1B:
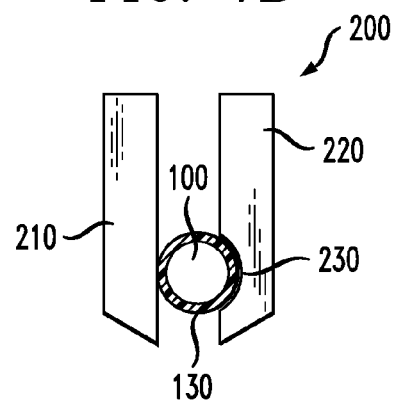

The apparatus comprises a handling tool. Referring to FIGS. 1A and 1B (collectively FIG. 1), a handling tool 200 is schematically shown in perspective and side views respectively. Although a handling tool may comprise various parts and components necessary for its operation, the present disclosure is only concerned with some of the actions performed by the handling tool when the handling tool is holding and/or moving a portion of an optical fiber. Therefore, for simplicity, only the part of the handling tool which is used for holding and moving the portion of the optical fiber is illustrated in the FIGs., other parts and components being considered not needed to be illustrated for the purpose of the present disclosure.

The handling tool comprises two jaws 210 and 220. At least one of the two jaws may have a recess or notch 230 to receive the outer surface of the optical fiber and provide a firm grip thereof. The recess preferably has a partially circular cross-section in conformity with the cylindrical shape of the optical fiber. At least one of the two jaws 210, 220 is configured to move away and toward the other jaw to thereby grip or release and object in a manner similar to a pair of tweezers or pliers. Using the jaws 210 and 220 the handling tool 200 is capable of holding a portion of an optical fiber 100.

It is to be noted that the optical fiber 100 is typically very fragile and therefore it is often protected inside a plastic cover 130 in the form of a sleeve surrounding rather tightly the length of the optical fiber. The handling tool 200 therefore is configured to hold the optical fiber at a point where it is covered by the sleeve 130. However the part of the optical fiber which will undergo clamping, cleaving, being immersed in adhesive and inserted in a ferrule (as will be described hereinbelow), is a part from which the sleeve 130 is removed as it is observable in the FIGs.

The handling tool 200, with or without an object held between its jaws, is configured to move in a three-dimensional space. The handling tool may be programmed to perform the actions attributed to it in the present disclosure.

Figure 2:
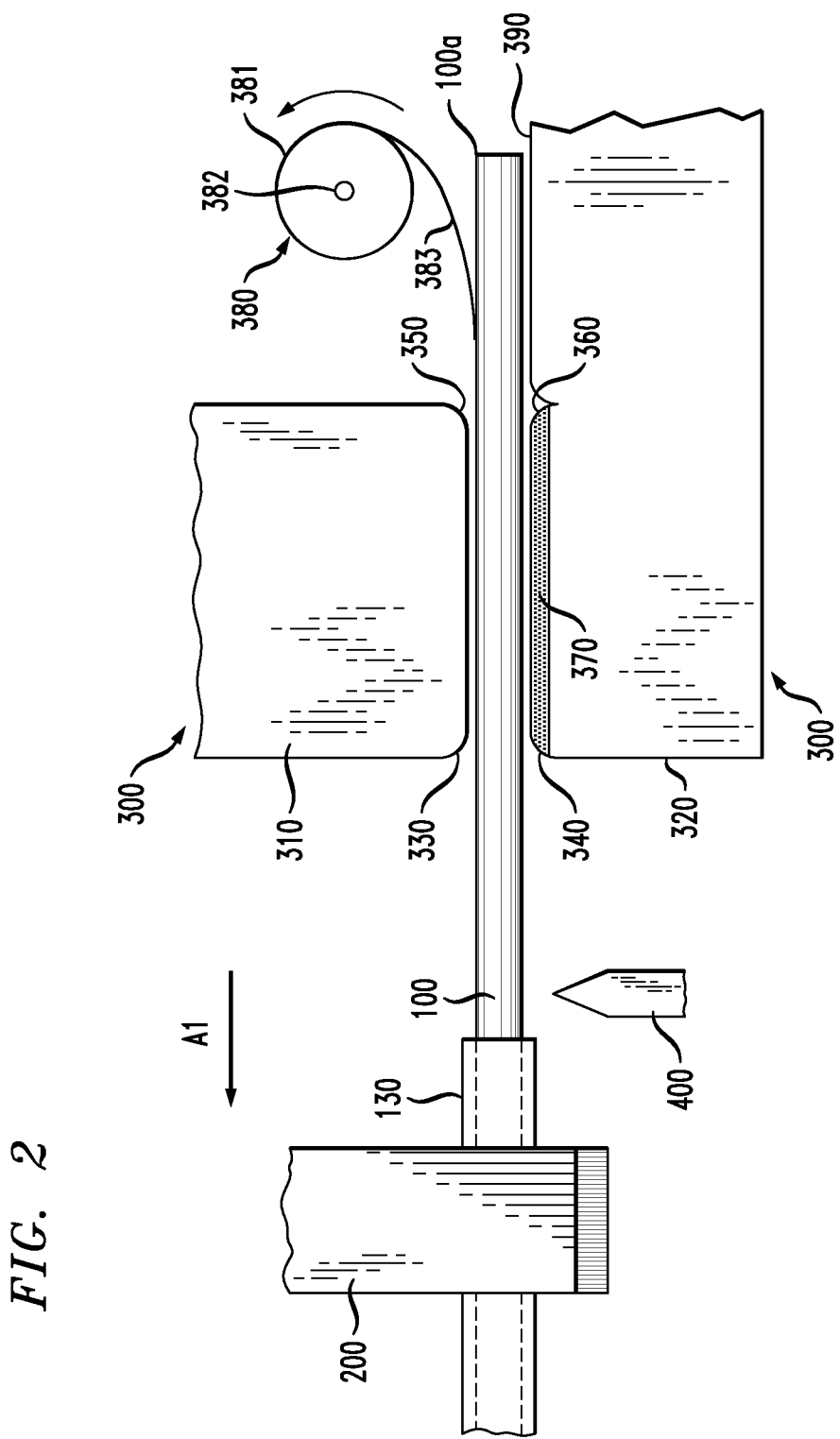
FIG. 2 is an exemplary schematic representation of a stage for cleaving of an optical fiber according to some embodiments.

The apparatus further comprises a clamp element and a cutter. Referring to FIG. 2 a clamp element 300 and a cutter 400 are shown which together with the handling tool 200 are configured to perform a cleaving operation as will be described below.

The clamp element 300 comprises two platforms 310 and 320. At least one of the two platforms 310, 320 is configured to move away and toward the other platform to thereby clamp or release a portion of an optical fiber 100.

The cutter 400 may be made in the form of a sharp-edged structure capable of cutting or producing an initial defect (e.g. fracture) in the optical fiber. For example, the cutter 400 may have the form of a wedge and may be made of any suitable material such as ruby, carbide or diamond.

In order to perform the clamping operation, the handling tool 200 with a portion of an optical fiber 100 may be made to move toward the clamp element 300 and the cutter 400. In an initial position, the platforms 310 and 320 of the clamp are separated from each other to allow the insertion of an object therebetween. Likewise the cutter 400 is in an initial position so as to ensure that it does not interfere with the insertion of the optical fiber in the clamp as described below.

The handling tool 200 may hold the portion of the optical fiber 100 such that an end of the optical fiber is free. The handling tool 200 is configured to place the free end of the optical fiber 100 between the platforms 310 and 320 of the clamp element 300. The clamp element 300 is configured to move its platforms 310, 320 toward each other to hold (clamp) the free end of the optical fiber 100 as shown in FIG. 2.

Preferably, one or both of the platforms 310 and 320 have a rounded (or smoothened) edge 330, 350 and/or 340, 360. These rounded edges are useful as they avoid sharpness at the edges. In the absence of the rounded edges the optical fiber 100, when clamped and tensed, may break at the sharp edges.

The clamp platforms 310 and 320 may be made of appropriate rigid, flat and smooth material such as glass or plastic. Preferably one of the two platforms (or both) may have a thin sheet of a flexible material, such as plastic, adhered thereon. In FIG. 2 one of the platforms 320, is shown to have a sheet 370 of flexible material adhered thereto. This flexible sheet is useful as it avoids an excessive rigidity imposed on the optical fiber as it is clamped. For example, in case an external (unwanted) particle is present on the surface of one of the two platforms 310, 320, an irregularity in the pressure imposed on the optical fiber may occur thus causing the optical fiber to break. The flexile sheet may help absorb some of this irregularity in pressure and avoid possible breakage in the optical fiber.

Preferably, one or both platforms 310, 320 may comprise a groove to receive the optical portion before it is clamped.

The diameter of the groove may be in conformity to the diameter of the optical fiber so as to adequately receive the latter.

The cleaving operation may be performed as follows. Once the optical fiber 100 is held between the handling tool 200 and the clamp element 300, it may be tensed by pulling the handling tool 200 and the clamp element 300 away from each other. For example the handling tool 200 may be moved away from the clamp element 300 as shown by arrow A1. Tensing the optical fiber enables better cleaving results.

Once the optical fiber 100 is tensed, the cutter 400 is moved toward the optical fiber 100 (e.g. moving upward in FIG. 2) and the sharp edge thereof is brought into contact with the latter. Then, the sharp edge of the cutter 400 is made to slide or rub against the surface of the optical fiber (for example as a knife is moved to cut an object) to thereby create a defect in the optical fiber 100 causing it to break. Alternatively the optical fiber 100 may be made to move (e.g. a fraction of a millimeter) relative to the sharp edge of the cutter 400 (which may be fixed) rubbing against it and thereby producing the defect and break.

Preferably the sharp edge of the cutter 400 enters in contact with the surface of the optical fiber in a direction which is perpendicular to the surface of the fiber. This may ensure a substantially flat cleaving of the end of the fiber substantially without defects.

After cleaving the optical fiber 100, the handling tool still holding the cleaved portion 110 of the optical fiber moves to another stage of the operation. However, a cut segment of the optical fiber 100*a* remains on a surface 390 of the clamp element 300. It is preferable that the cut segment is removed from the clamping area to avoid interference during the clamping and cleaving operation of the next optical fiber.

To this end, the clamp element may further comprise a sweeper 380 configured to sweep such cut segments of the optical fiber remaining on the clamp after the optical fiber is cleaved. The sweeper 380 may comprise a wheel 381 configured to rotate about a central axis 382 as shown by an arrow drawn next to the wheel 381. At least one sweeper sheet 383 may be attached to a point on the circumference of the wheel 381. The sweeper sheet 383 is preferably of planar shape and is made of a flexible material. As the wheel 381 rotates, it causes the sweeper sheet 383 to rotate with it thus bringing the sweeper sheet 383 in contact with the surface 390 of the clamp 300 at a certain point of rotation as shown in FIG. 2. At this point the sweeper sheet 383 may enter into frictional contact with the cut segment 100*a* and, with additional rotation of the wheel 381, sweep the cut segment 100*a* away from the clamping area thereby leaving the clamping area free of the unwanted fiber segment 100*a*.

It is noted that instead of one or more sweeper sheets 383 the wheel may be made in the form of a circular brush. Such circular brush may be advantageous in cases where a continuous sweeping action is required.

Figure 3:
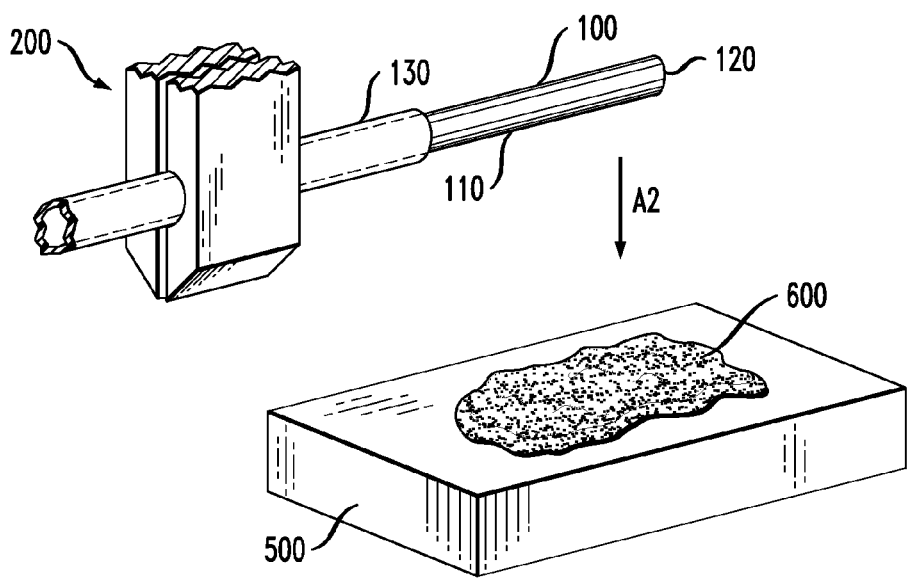
FIG. 3 is an exemplary schematic representation of a stage of applying an adhesive according to some embodiments.

Next, adhesive is applied to the cleaved end of the optical fiber 100. As shown in FIG. 3, handling tool 200, holding the cleaved optical fiber 100, is moved proximate and above a reservoir 500 containing adhesive 600. The handling tool 200 is then moved toward the reservoir 500 as shown by arrow A2 in order to immerse (dip) a cleaved portion 110 of the cleaved optical fiber 100 in the adhesive 600. The adhesive 600 may preferably be in liquid form and may be of any commercially available type such as any suitable glue. The handling tool is then moved away from the reservoir 500 (e.g. in a direction opposite to arrow A2). As the handling tool 200 moves away from the reservoir 500, the cleaved portion 110 of the cleaved optical fiber carries small droplets of adhesive located thereon.

In some embodiments, the cleaved portion 110 is removed from the adhesive such that the length of the cleaved portion of the optical fiber is removed from the adhesive as it is held parallel to the surface of the adhesive 600. One example is shown in FIG. 2, in which the handling element may hold the cleaved portion of the optical fiber horizontally and immerses the cleaved portion 110 of the optical fiber in the adhesive 600 by a vertical motion of the handling tool 200, as shown by arrow A2; and removes the horizontally held cleaved portion 110 from the adhesive 600 also in a vertical, although opposite, direction.

This techniques of removing the cleaved portion 110 from the adhesive while it is held in parallel direction to the surface of the adhesive is advantageous because it allows for a relatively even distribution of droplets along the length of the optical fiber; whereas if the cleaved portion (e.g. held horizontally) is immersed and removed horizontally or in an angle with respect to horizontal, the consequence would be that the adhesive may gather substantially at the free end of the optical fiber which is undesirable because only a limited amount of adhesive will be available at the end of the cleaved portion which may not be enough for a secure and strong bonding.

In practice, the cleaved portion 110 of the optical fiber 100 as held by the handling tool 200 often does not define a straight line and is typically bent to a side due to a surface tension present on the plastic sleeve 130 covering the optical fiber.

Figure 4A:
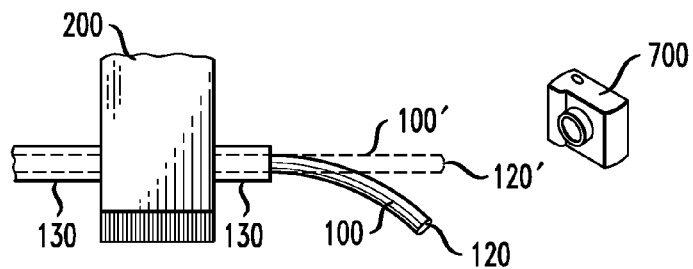
FIGS. 4A and 4B are exemplary schematic representations of a stage of detecting and measuring the exact position of a cleaved end of an optical fiber according to some embodiments

FIG. 4A schematically illustrates the handling tool 200 holding the optical fiber 100. As can be seen, the optical fiber 100 is slightly bent to a side (downward in the figure) from a straight position 100' shown by dotted lines. Therefore the exact position of the cleaved end 120 of the optical fiber is slightly away from a theoretical centered position 120', had the optical fiber maintained a straight shape.

Therefore it may be required to detect the exact position of the cleaved end 120 of the optical fiber, as it is held by the handling tool, in order to perform a precision insertion of the optical fiber in a ferrule.

Figure 4B:
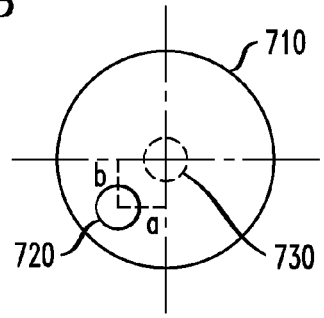

In order to detect the exact position of the cleaved end 120 of the optical fiber, a camera 700 may be used. Camera 700 may be located at a suitable position (e.g. facing the cleaved end 120) so as to be capable of capturing images of the cleaved end 120. Camera 700 may be configured to transmit the data related to the captured images to a controller (not shown) which may be programmed to analyze and determine the amount and position of the deviation of the cleaved end 120; it may also be configured to transmit the data related to the captured images to a screen or to a printer. FIG. 4B shows a schematic representation of an example of an image 710 captured by the camera 700 of FIG. 4A. The image 710 shows the real and exact position 720 of the cleaved end 120. For further clarity, the image is shown in Cartesian coordinates. As can be seen, the position 720 of the cleaved end 120 is at a certain distance and angle from a central position 730 where the cleaved end would have been positioned, had the cleaved portion of the optical fiber maintained a straight shape as discussed above. This deviation of the cleaved end from the central position may be measured, for example as shown by dotted lines a and b, as accurately as possible and the resulting measurement may be taken into account such that the real (e.g. off-centered) position of the cleaved end 120 of the optical fiber is accurately brought at the entrance of a ferrule to be inserted therein.

Figure 5:
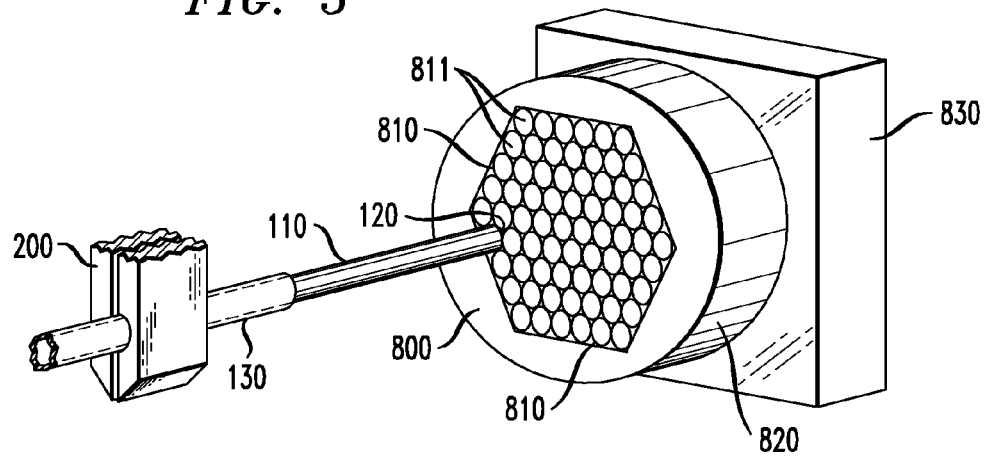
FIG. 5 is an exemplary schematic representation of an optical fiber to be inserted inside a ferrule in an array of ferrules according to some embodiments.

FIG. 5 is a schematic representation of a stage where the cleaved optical fiber 110 (with the exact position of the cleaved end 120 having been detected) is brought in proximity to an array structure 800 comprising a plurality of ferules 810 held inside a support structure 820 which may be for example a chuck.

The array structure 800 may be a component of the apparatus as disclosed herein, or it may be an independent component which is usable in conjunction with the handling tool and other components of the apparatus.

The array structure 800 is held in a fixed position and the ferrules 810 within the array structure 800 are positioned such that the entrance end 811 of each one of the ferrules is adjacent the entrance end of one or more ferules adjacent to it to thereby form an array of entrances for the insertion of optical fibers. As the support structure 800 is fixed in position, the exact position of each of the entrances 811 of the ferrules 810 may be known.

In some embodiments, the array structure 800 further comprises a flat and transparent plate 830 located at a side of the array structure 800 opposite to the side where the optical fiber is inserted into the ferrules. Further details related to the plate 830 will be provided with reference to FIG. 6.

With this arrangement, the handling tool 200 may be moved to align the cleaved end 120 of an optical fiber 100 to an entrance 811 of a respective ferrule 810 (both these positions being accurately known) for the insertion of the optical fiber therein.

Figure 6A:
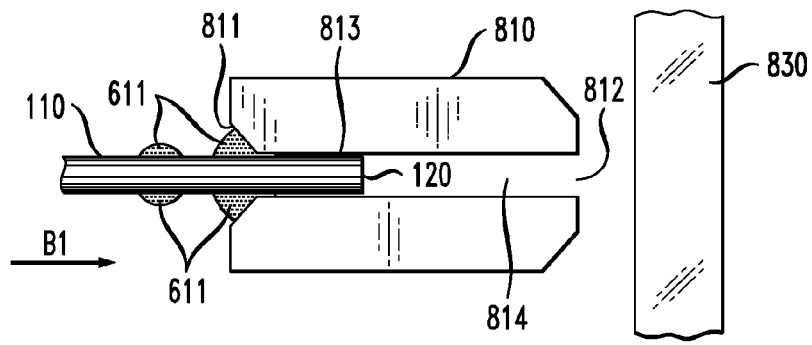
FIGS. 6A, 6B, and 6C are exemplary schematic representations of different stages of inserting an optical fiber in a ferrule.
Figure 6B:
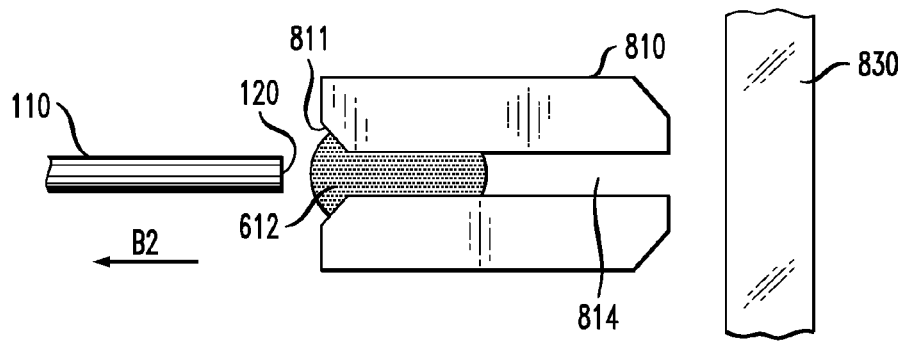
Figure 6C:
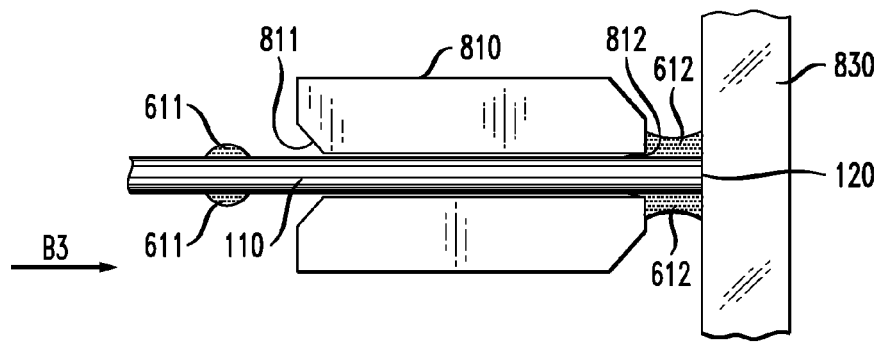

FIGS. 6A, 6B and 6C show examples of various stages of the insertion operation according to some embodiments. For simplicity of illustration, only a cleaved portion 110 of the optical fiber, a respective ferrule 810 and a region of the plate 830 facing the ferrule 810 are shown.

At a first stage, as shown in FIG. 6A, the cleaved portion 110 of the optical fiber with adhesive droplets 611 distributed at various points along its length is inserted in a ferrule 810. The insertion is made by the handling tool (not shown). The ferrule 810 has an entrance end 811 and an exit end 812 with a longitudinal cylindrical through-hole 814 connecting the entrance end 811 with the exit end 812. The cleaved portion 110 of the optical fiber is inserted in the through-hole 814 in a direction from the entrance end 811 to the exit end 812 as shown by arrow B1. The entrance end 811 of the ferrule may have a conical shape to provide a guiding structure for the cleaved end 120 of the optical fiber into the ferrule. The cross-sectional diameter of the ferrule along its through-hole 814 may be very close, in magnitude, to the cross-sectional diameter of the optical fiber, for example in the order of one micron larger.

As a consequence, upon inserting the cleaved portion 110 of the optical fiber into the ferrule 810, the adhesive droplets 611 are trapped between the outer surface 111 of the cleaved portion 110 and the inner surface 813 of the ferrule 810. The adhesive droplets may also become gathered over the entrance end 811 of the ferrule and around the optical fiber 100, as shown.

The cleaved portion 110 may be inserted in any convenient length inside the ferrule and may be made to pass through and beyond the exit end 812 of the ferrule.

Next, referring now to FIG. 6B, the cleaved portion 110 of the optical fiber is withdrawn from the ferrule 810 as shown by arrow B2. Here also, the withdrawal of the cleaved portion is made by the handling tool (not shown). As the cleaved portion 110 is withdrawn from the ferrule, most of the adhesive droplets 611 remain in place on the entrance end 811 or inside the through-hole 814 of the ferrule and may join together to collectively form a volume of adhesive 612 in such regions.

Furthermore, adhesive 612 may also be drawn in the through-hole 614 by the action of capillary forces.

In the next stage, FIG. 6C, the cleaved portion 110 is reinserted into the ferrule 810 as shown by arrow B3. The reinsertion of the cleaved portion 110 inside the ferrule (also done by the handling tool) causes the volume of adhesive 612 to be centered at and pushed out of the exit end 812 of the ferrule and rest against the plate 830. The cleaved portion 110 of the optical fiber is inserted sufficiently such that the cleaved end 120 of the optical fiber abuts against the plate 830. At this position, the adhesive 612 surrounds the cleaved end 120 and also rests on the surface of the plate 830, as shown in FIG. 6C.

The adhesive may then be hardened by known techniques, such as the use of ultraviolet light, to maintain the cleaved end 120 bonded in place on the plate 830.

It is to be noted that the insertion of the cleaved portion 110 in, and past, the ferrule's exit end 812 until the cleaved end 120 is adequately abutted against the plate 830 may need to be performed with accuracy such that the insertion is neither too short—so that the cleaved end does not reach the plate, nor it is driven too far—so that the cleaved end is excessively pressed against the plate. Indeed, if each optical fiber is installed in such a way that it exerts certain amount of pressure on the plate, once a large number of fibers are installed and bonded thereon, the pressures corresponding to each of the individual fibers may sum up and accumulate on the surface of the plate as a high pressure which could eventually break the plate.

To avoid the above problem, one remedy may be to accurately determine the position of the cleaved end 120 from the plate 830. Such determination may be made using a further camera (not shown) located at a convenient position to be able to capture an image of the length of the optical fiber. If L is a length measured from the point at which the cleaved portion is held by the handling tool to its cleaved end 120.

Furthermore, as the array structure 800 is fixed in position, the position of the plate 830 attached thereto is also fixed and known. It is assumed that the handling tool starts the reinsertion operation from an initial position which is at a distance D from the surface of the plate 830, where distance D is measured from the point at which the cleaved portion is held by the handling tool to the surface of the plate facing the cleaved end 120. Therefore, the handling tool may be programmed to reinsert the cleaved portion 110 (FIG. 6C) only by a precise distance of D-L thereby advancing the cleaved end 120 of the optical fiber toward the plate sufficiently to only abut against it without substantial pressure exerted on the plate.

Alternatively, an additional technique for ensuring proper abutting of the cleaved end 120 against the plate 830 may be reinserting the cleaved end into the ferrule and abutting it against the plate 830 (see FIG. 6C), pushing in a controlled manner the optical fiber still further toward the plate 830 to purposefully cause the optical fiber to bend, then releasing the optical fiber by the handling tool after the optical fiber is bent. Once the optical fiber is released, the pressure thereon is removed thus causing the optical fiber to relax and remain abutted against the plate, and held by the adhesive, without substantially exerting pressure on the plate.

Preferably during the above process the adhesive may be hardened simultaneously so that when the handling tool releases the optical fiber the adhesive is neither too soft to let the optical fiber move from its appropriate position nor is it too hard to hold the optical fiber with pressure on the plate.

Once all the optical fibers are inserted and bonded to the plate as described above, additional adhesive may be applied on the side corresponding to the entrance ends 811 of the ferrules to bond the ferrules and the inserted optical fibers together.

The use of the flat transparent plate 830 is advantageous as by receiving individual cleaved ends of optical fibers on a surface thereof is it ensured that all the cleaved ends are positioned substantially coplanar to collectively form a flat face for the array. The plate 830 may be made of an optically transparent material such as glass and may have an anti-reflection coating to avoid optical losses from the interface between the plate and air. In some embodiments, the plate may have the same index of refraction as the optical fiber. This is advantageous as reduces the amount of back reflection into the fiber from the fiber-plate interface.

In some embodiments, the use of the transparent plate 830 may be avoided. In such cases, the cleaved portion of the optical fiber may be immersed into adhesive without immersing the cleaved end of the optical fiber therein. In this manner, during installation when the cleaved portion is inserted into the ferrule, it can be inserted until it is abutted against a flat surface which needs not be adhered to the cleaved end of the optical fibers and only serves for providing a common plane to ensure that the cleaved ends of all the installed optical fibers form a flat and coplanar face. The flat surface can then be removed after the completion of the installation of all the optical fibers.

The handling tool 200 may be selected from any commercially available precision machines such as for example one manufactured by Zaber Technologies Inc. These machines can be programmed in order to perform the actions described above in relation to the various stages of the manufacturing process.

Some embodiments of the disclosure feature a method.

Figure 7:
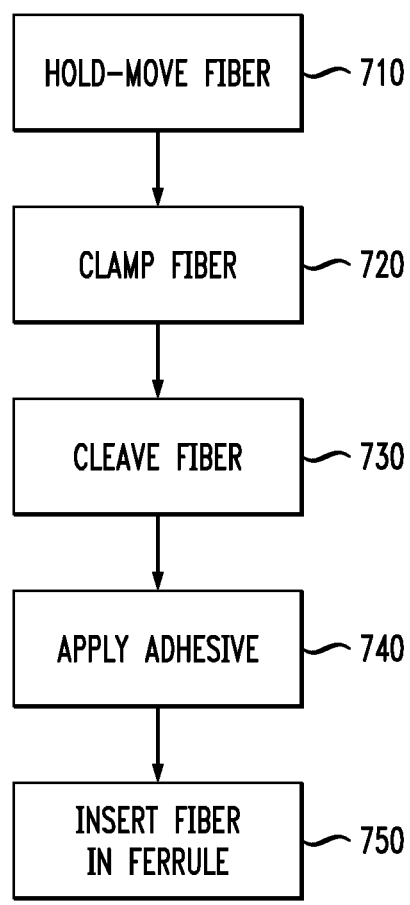
FIG. 7 shows a flow chart representing some steps for manufacturing an array of optical fibers.

With reference to FIG. 7, in a step 710, a handling tool 200 holds a portion of an optical fiber 100 and moves it in a three-dimensional space to locate it proximate to a clamp element 300 and a cutter 400. In a step 720, an end of the optical fiber 100, held by the handling tool 200, is clamped by the clamp element 300. In a step 730, the cutter 400 is used to cleave the optical fiber 100 held at one portion by the handling tool 200 and at an end by the clamp element 300, to provide a cleaved end 120 of the optical fiber. In a step 740, the handling tool 200 immerses the cleaved end 120 of the optical fiber into an adhesive reservoir 500. In a step 750, the cleaved end of the optical fiber with adhesive adhered thereto is inserted inside a ferrule of an array of ferrules.

In step 730, after cleaving the optical fiber 100, a segment of the optical fiber remaining in the clamping area may be removed from the clamping area by a sweeper 380.

In step 740, applying the adhesive may comprise holding the cleaved portion of the optical fiber horizontally and immersing the cleaved portion 110 of the optical fiber in the reservoir by a vertical motion of the handling tool 200.

In step 740, after applying adhesive, an exact position of the cleaved end 120 of the optical fiber 100 as held by the handling tool 200 may be detected by a camera 700 configured to capture images of the cleaved end 120.

In step 750, the insertion operation may comprise:
inserting the cleaved portion 110 of the optical fiber with adhesive droplets 611 distributed at various points along its length into a ferrule 810;
withdrawing the cleaved portion 110 of the optical fiber from the ferrule 810; and
reinserting the cleaved portion 110 into the ferrule 810.

At least some of steps described above in order to carry out the method as disclosed herein may be programmed in a programmable computer or processor or similar device and performed automatically. In particular all the steps described above with respect to the movements and actions performed by the handling tool 200 may be performed automatically and commanded and controlled by a computer programmed for performing such movements and actions.

The above technique described with respect to manufacturing an optical fiber array using individual optical fibers may be adapted for use with an optical fiber ribbon. In such case, the handling tool may be configured to hold individual optical fiber ends from the optical fiber ribbon and perform the same processes on each optical fiber end, one after the other, as described above with reference to individual optical fibers.

The various elements disclosed and claimed herein may include blocks which can be hardware devices, software modules or combination of hardware devices and software modules This method can be advantageously implemented on an Application Specific Integrated Circuit (ASIC), a Field Programmable Gate Array (FPGA) and/or a microprocessor, and in a preferred embodiment through or together with a software program. Therefore, it is understood that the scope of the protection is extended to such a program and in addition to a computer readable means having a message therein, such computer readable storage means contain program code means for the implementation of one or more steps of the method, when this program is run on a computer, an ASIC, an FPGA or a microprocessor.

The various embodiments of the present invention may be combined as long as such combination is compatible and/or complimentary.

It is to be noted that the list of structures corresponding to the claimed elements and features is not exhaustive and that one skilled in the art understands that equivalent structures can be substituted for the recited structure without departing from the scope of the invention.

It is also to be noted that the order of the steps of the method of the invention as described and recited in the corresponding claims is not limited to the order as presented and described and may vary without departing from the scope of the invention.

It should be appreciated by those skilled in the art that any block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown.

What is claimed is:

1. An apparatus comprising:
    a handling tool configured to hold and move a portion of an optical fiber in a three-dimensional space, said portion having a free end;
    a clamp element configured to clamp the free end of the optical fiber;
    a cutter configured to cleave the portion of the optical fiber to produce a cleaved portion of the optical fiber having a cleaved end;
    an adhesive reservoir;
    wherein the handling tool is configured to:

move the portion of the optical fiber toward the clamp element;

hold the portion of the optical fiber, with the free end of the optical fiber clamped by the clamp element, to allow the cutter to produce the cleaved portion of the optical fiber having a cleaved end;

immerse the cleaved portion of the optical fiber in the adhesive reservoir; and insert the cleaved portion of the optical fiber with adhesive adhered thereto inside a ferrule of an array of ferrules.

2. The apparatus of claim 1, wherein the clamp element comprises two platforms, one or both of the platforms having a rounded edge.

3. The apparatus of claim 2, wherein at least one of the two platforms of the clamp element has a sheet of a flexible material adhered thereon.

4. The apparatus of claim 1, further comprising a sweeper for removing an unwanted segment of optical fiber away from a clamping region.

5. The apparatus of claim 4, wherein the sweeper comprises a wheel configured to rotate about a central axis and at least one sweeper sheet or a brush attached to the circumference of the wheel and configured to sweep said unwanted segment away from the clamping region in response to the rotation of the wheel.

6. The apparatus of claim 1, wherein the handling tool is configured to remove the cleaved portion of the optical fiber from the adhesive such that the length of the cleaved portion of the optical fiber is parallel to the surface of the adhesive.

7. The apparatus of claim 1, further comprising a camera configured to detect a position of the cleaved end of the cleaved optical fiber held by the handling tool.

8. The apparatus of claim 1, further comprising a structure including:

a plurality of ferrules at least some of the plurality of ferrule each being configured to receive a respective cleaved end of an optical fiber at an entrance end and allow the passage of the cleaved end of the optical fiber at an exit end;

a chuck configured to hold the plurality of ferrules in an array; and a transparent plate provided at a side of the chuck proximate to the exit ends of the plurality of ferrules; the plate being configured to receive the respective cleaved end of the optical fiber abutted and bonded on a surface thereof.

9. The apparatus of claim 8, wherein the handling tool is configured to push a volume of adhesive out of the exit end of a ferrule and abut the cleaved end of the optical fiber with the volume of adhesive being in contact with the cleaved end of the optical fiber and the surface of the transparent plate.

10. The apparatus of claim 9, wherein the handling tool is configured to withdraw, after a first insertion, the cleaved end of the optical fiber from the ferule and reinsert the cleaved end of the optical fiber to thereby push the volume of adhesive out of the exit end of the ferrule.

11. The apparatus of claim 10, wherein the handling tool is configured to reinsert the cleaved end of the optical fiber in the ferrule by a distance equal to: D-L where D is a distance measured from a point at which the cleaved portion of the optical fiber is held by the handling tool to the surface of the plate facing the cleaved end, and L is a distance measured from the point at which the cleaved portion is held by the handling tool to the cleaved end of the optical fiber.

12. The apparatus of claim 10, wherein the handling tool is configured to reinsert the cleaved end of the optical fiber into the ferrule, abut it against the plate, further push the optical fiber toward the plate to cause the optical fiber to bend, and release the optical fiber after the optical fiber is bent.

13. The apparatus of claim 8, wherein the plate is flat and is configured to receive the cleaved ends of the optical fibers positioned in a substantially coplanar arrangement to collectively form a flat face for the array.

14. The apparatus of claim 8, wherein the plate has an anti-reflection coating provided on its surface and has an index of refraction which is equal to an index of refraction of the optical fiber.

15. The apparatus of claim 1, further comprising a structure including:

a plurality of ferrules at least some of the plurality of ferrule each being configured to receive a respective cleaved end of an optical fiber at an entrance end and allow the passage of the cleaved end of the optical fiber at an exit end;

a chuck configured to hold the plurality of ferrules in an array; and a flat surface provided at a side of the chuck proximate to the exit ends of the plurality of ferrules; the flat surface being configured to receive the respective cleaved end of the optical fiber abutted thereof.

16. A structure comprising:

a plurality of ferrules at least some of the plurality of ferrule each being configured to receive a respective cleaved end of an optical fiber at an entrance end and allow the passage of the optical fiber at an exit end;

a chuck configured to hold the plurality of ferrules in an array; and a transparent plate provided at a side of the chuck proximate to the exit ends of the plurality of ferrules; the plate being configured to receive the respective cleaved end of the optical fiber bonded on a surface thereof.

17. A method comprising:

holding, by a handling tool, a portion of an optical fiber in a three-dimensional space, said portion having a free end;

moving, by the handling tool, the portion of the optical fiber toward a clamp element;

clamping, by the clamp element, the free end of the optical fiber held by the handling tool;

cleaving, by a cutter, the portion of the optical fiber to provide a cleaved portion of the optical fiber having a cleaved end;

immersing, by the handling tool, the cleaved portion of the optical fiber in the adhesive reservoir; and inserting, by the handling tool, the cleaved end of the optical fiber with adhesive adhered thereto inside a ferrule of an array of ferrules.

18. The method of claim 17, wherein inserting the cleaved portion of the optical fiber with adhesive adhered thereto inside a ferrule comprises:

inserting the cleaved portion with adhesive adhered thereto inside the ferrule;

withdrawing the cleaved portion from the ferrule; and reinserting the cleaved portion of the optical fiber to thereby push a volume of adhesive out of an exit end of the ferrule.

19. The method of claim 18, wherein the reinserting of the cleaved portion of the optical fiber into the ferrule further includes:

abutting the cleaved end against a plate and further pushing the optical fiber toward the plate to cause the optical fiber to bend; and releasing the optical fiber after the optical fiber is bent.

20. The method of claim 17, wherein immersing the cleaved portion of the optical fiber in the adhesive reservoir is followed by removing the cleaved portion of the optical fiber from the adhesive such that the length of the cleaved portion of the optical fiber is parallel to the surface of the adhesive.

* * * * *